(No Model.) 4 Sheets—Sheet 1.
W. R. MERSHON.
DRAWBRIDGE JOINT AND OPERATING MECHANISM.
No. 530,234. Patented Dec. 4, 1894.
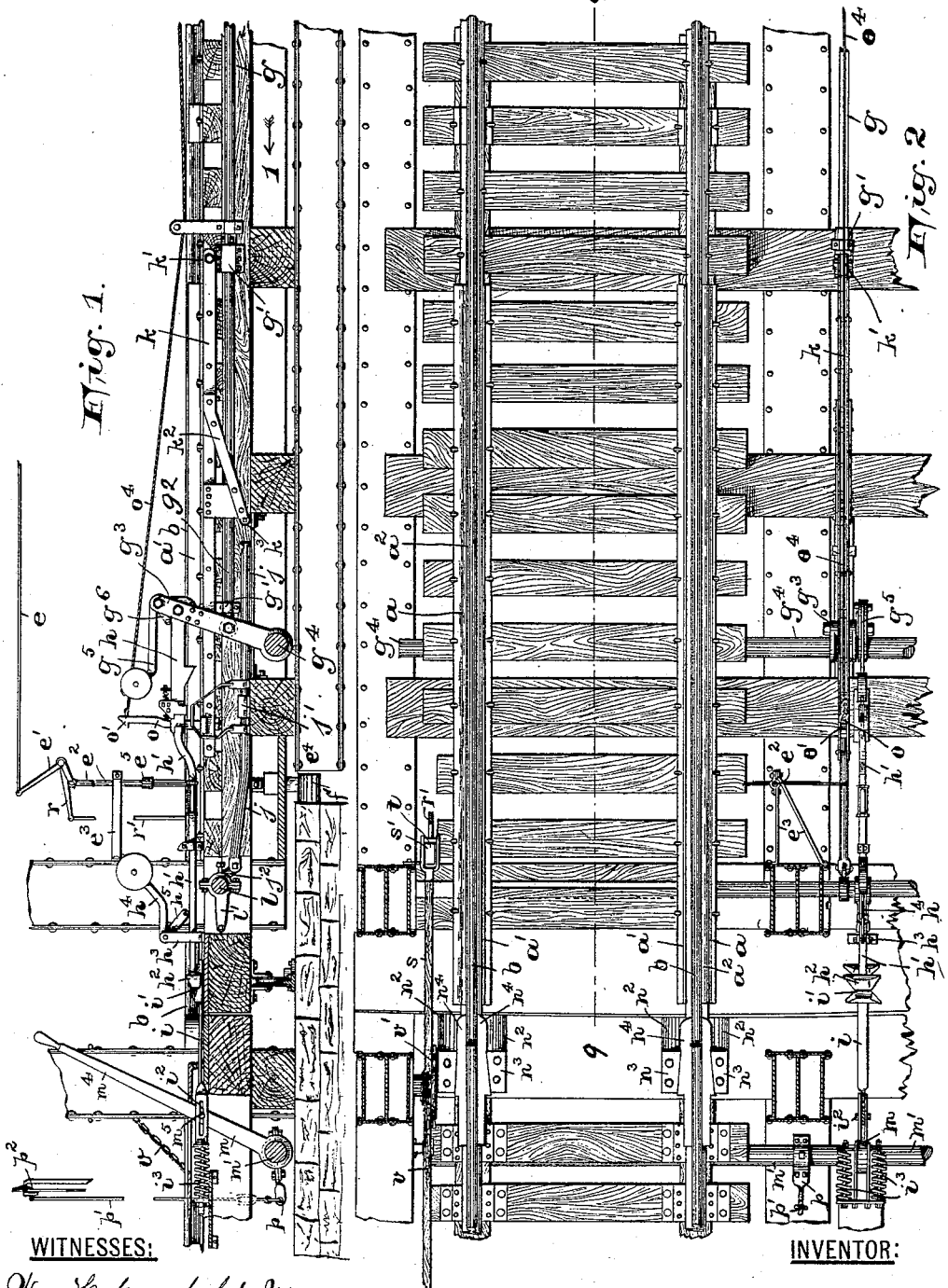
WITNESSES:
INVENTOR:
William R. Mershon,
BY Fred C. Fraentzel, ATT'Y.

(No Model.) 4 Sheets—Sheet 2.
W. R. MERSHON.
DRAWBRIDGE JOINT AND OPERATING MECHANISM.
No. 530,234. Patented Dec. 4, 1894.
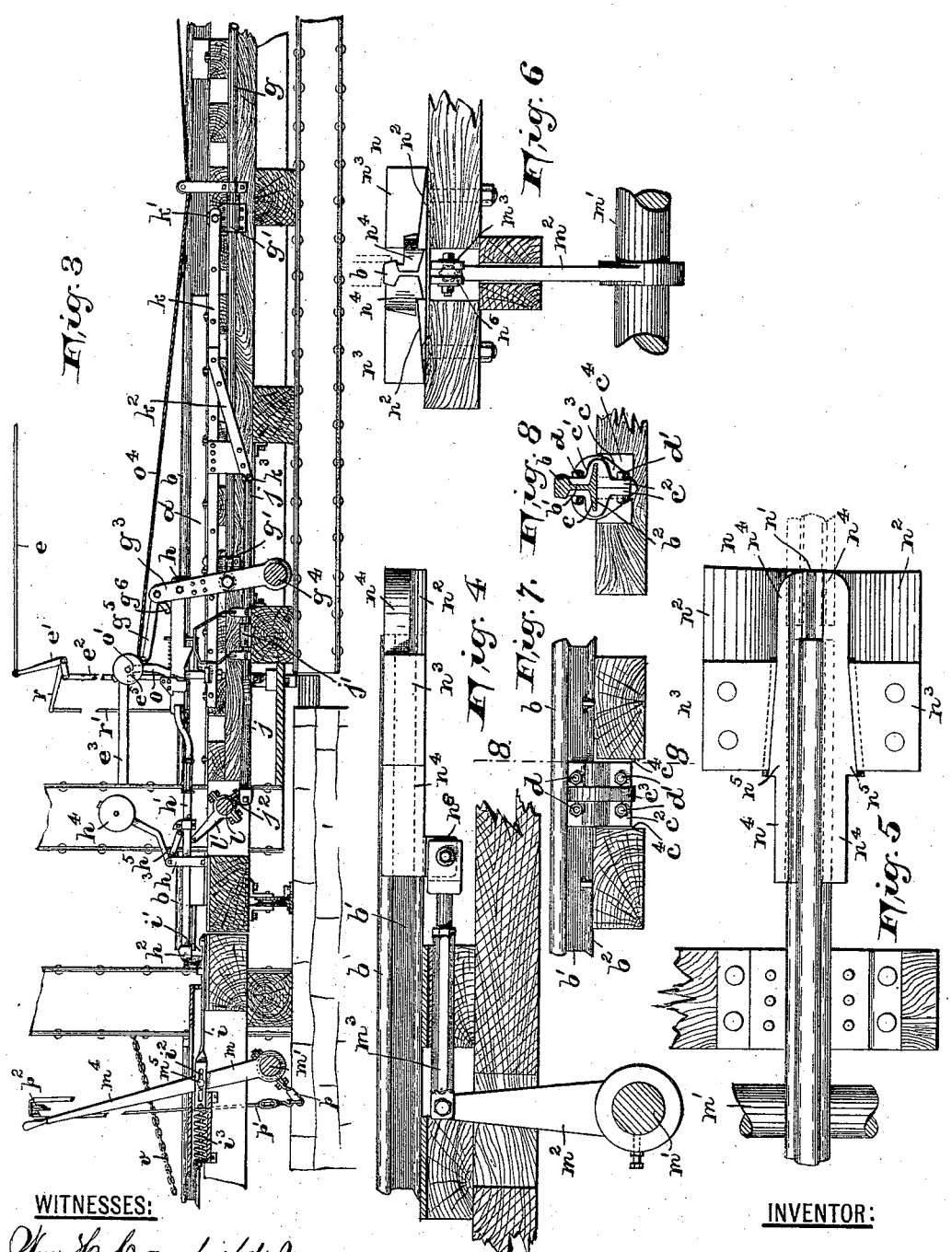
WITNESSES:
INVENTOR:
William R. Mershon,
BY Fred C. Fraentzel, ATT'Y.

(No Model.) 4 Sheets—Sheet 3.
W. R. MERSHON.
DRAWBRIDGE JOINT AND OPERATING MECHANISM.
No. 530,234. Patented Dec. 4, 1894.
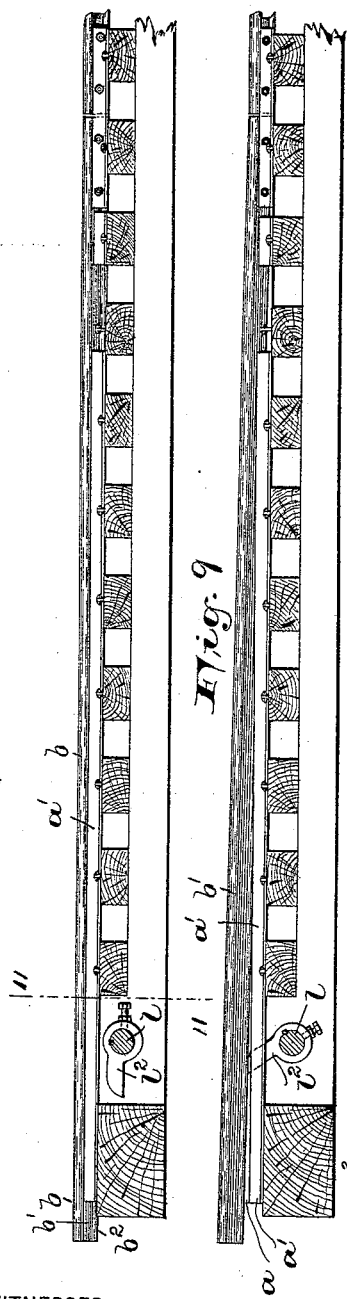
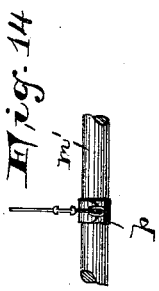
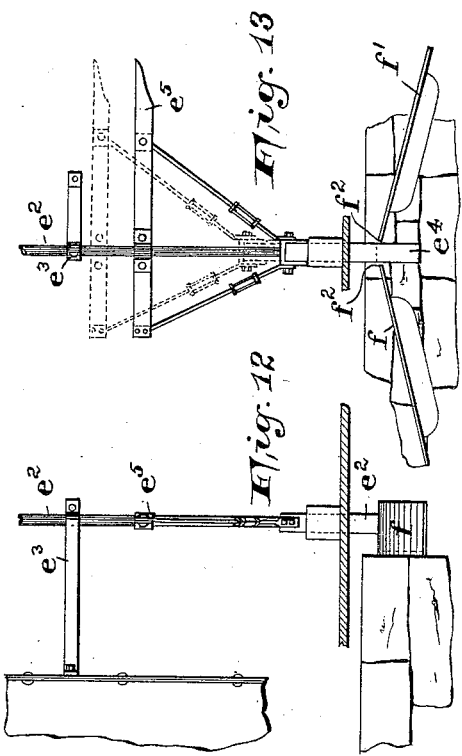
WITNESSES: INVENTOR:
Wm. H. Canfield, Jr. William R. Mershon,
H. W. Marsh BY Fred C. Fraentzel, ATT'Y.

(No Model.)   4 Sheets—Sheet 4.
W. R. MERSHON.
DRAWBRIDGE JOINT AND OPERATING MECHANISM.
No. 530,234.   Patented Dec. 4, 1894.
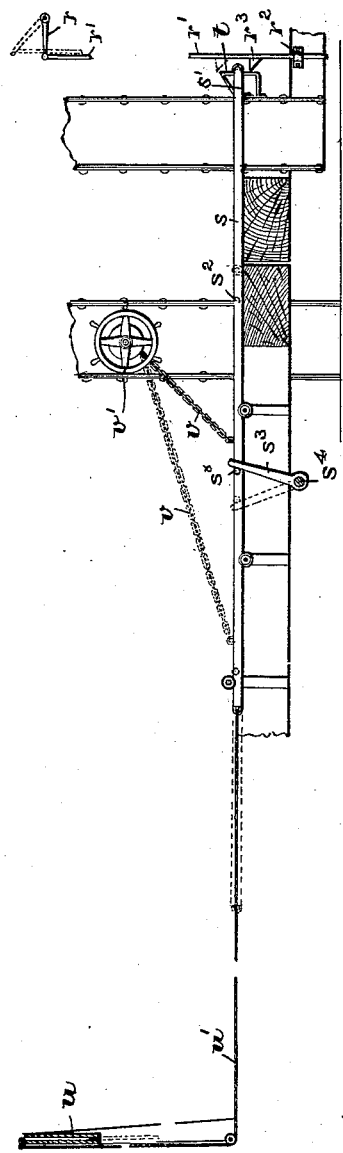
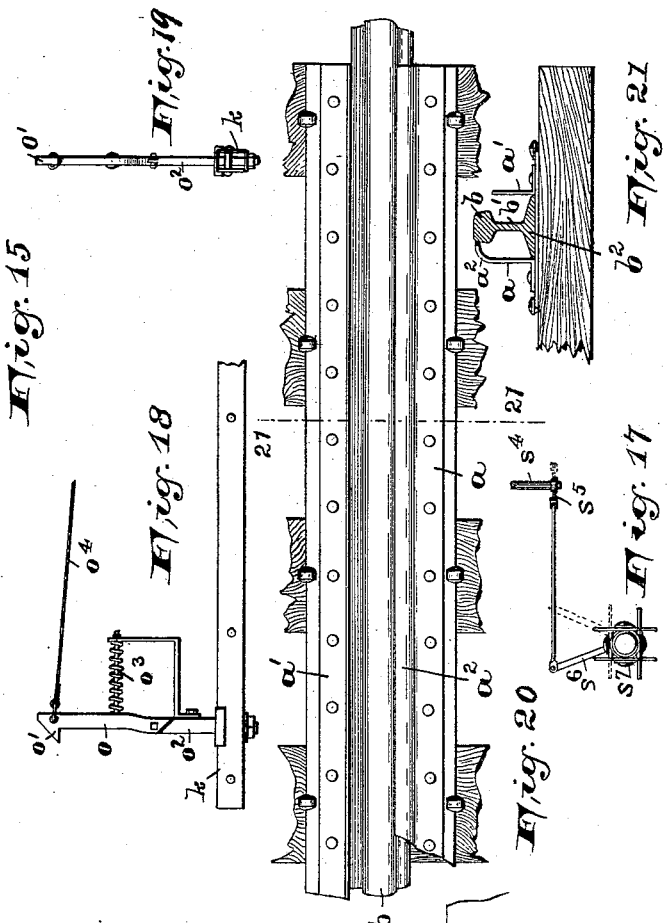
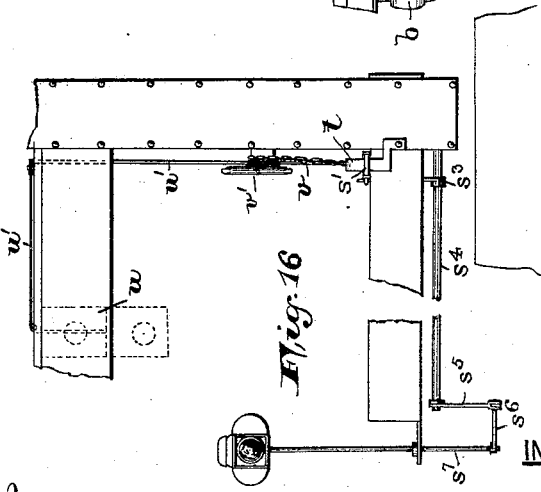
WITNESSES:   INVENTOR:
Wm. H. Camfield, Jr.   William R. Mershon,
H. M. Marsh.   BY Fred C. Fraentzel, ATT'Y.

UNITED STATES PATENT OFFICE.

WILLIAM R. MERSHON, OF NEWARK, NEW JERSEY, ASSIGNOR OF ONE-HALF TO SAMUEL SMITH, OF SAME PLACE.

DRAWBRIDGE-JOINT AND OPERATING MECHANISM.

SPECIFICATION forming part of Letters Patent No. 530,234, dated December 4, 1894.

Application filed April 12, 1894. Serial No. 507,221. (No model.)

*To all whom it may concern:*

Be it known that I, WILLIAM R. MERSHON, a citizen of the United States, residing at Newark, in the county of Essex and State of New Jersey, have invented certain new and useful Improvements in Drawbridge-Joints and Operating Mechanism; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has reference to improvements in draw-bridge joints and mechanism for operating the same, the object of the invention being to provide devices for joining the abutting ends of the draw and ground or fixed rails on railway bridges at the draw-joint, when the draw is closed, and also to prevent the displacement of the rails at the joint by passing trains.

The several features of the invention, as well as the best method of carrying out my invention, together with the advantages resulting therefrom, will be fully set forth hereinafter.

The invention therefore consists in the novel form and construction of draw-bridge joint herein set forth, as well as in the arrangement, construction, and operation of each and all of the various devices and operating mechanism herein set forth, and finally embodied in the clauses of the claim.

The invention furthermore consists in certain minor details of construction and combinations of parts, as for instance, mechanism employed in connection with the operating devices for setting certain danger signals.

The invention is illustrated in the accompanying sheets of drawings, in which similar letters of reference are employed to indicate like parts in each of the several views of said drawings.

Figure 1 represents a longitudinal vertical section of part of the draw and the abutment, provided with the fixed or ground rails of a railway bridge, illustrating in side elevation, certain operating mechanism employed in connection with the draw-bridge joint, embodying the principles of my invention. Fig. 2 is a plan view of said parts, illustrated in Fig. 1, showing also in connection therewith, the arrangement of the abutting ends of the rails of the draw with the ground or fixed rails on the abutment, when the draw is closed. Fig. 3 is a view similar to Fig. 1, with the operating mechanisms in their operative position, just prior to the withdrawal of the drawbridge joints or wedges from their holding or locked engagement, to permit the swinging open of the draw. Fig. 4 is an enlarged detail view, illustrating in side elevation, the draw-bridge joint and operating lever for withdrawing the wedges from their holding or locked engagement with the abutting ends of the rail-sections. Fig. 5 is a plan view of said parts, and Fig. 6 is an end view of the same. Fig. 7 is a detail view of a shoe (in side elevation) used in connection with the rails to prevent them from sliding longitudinally, when the car wheels strike either end of the rails, and Fig. 8 is a cross-section taken on line 8—8 in said Fig. 8. Fig. 9 is a longitudinal vertical section, taken on line 9—9 in Fig. 2, to more clearly illustrate the arrangement of a lifting cam adapted to engage with the under side of the rails to raise the end of the rail out of a groove in the wedge-receiving shoe secured on the abutment of the bridge. Fig. 10 is a similar view with said lifting cam in operative engagement with the rail, and Fig. 11 is a cross-section on line 11—11 in said Fig. 9. Figs. 12 and 13 are a side and a front view respectively of certain devices employed, which normally tend to retain the drawer in its closed position, but which are operated by certain mechanism, illustrated in Fig. 1, to raise certain parts of said devices to enable the swinging open of the draw. Fig. 14 is a detail view of a semaphore and mechanism for operating the same, to be used in the present construction, and Figs. 15, 16 and 17 are views of certain signaling devices and operating mechanism employed in my invention. Figs. 18 and 19 are a side view and an edge view respectively, of a certain locking post adapted to engage with the mechanism illustrated in Figs. 12 and 13, to prevent the parts shown therein from being raised until released from said locking post. Fig. 20 is a detail view, in plan, of the rail and a trough in which the rail is secured, to support the rail and to keep it in place in case the rail should become broken, and Fig. 21 is a cross-section, taken on line 21—21 in said Fig. 20.

As now ordinarily constructed, it is common for the abutting rails of the draw and the fixed portions of the bridge, more particularly the draw-rails, to become broken or displaced by the jar of the passing trains. To prevent the "lipping" or displacement of the rails $b$, even though they may become broken, I have arranged on each side of the rails, and extending about one-half their length, what I term a "rail-trough," consisting essentially, as will be seen from Figs. 20 and 21, of certain plates or sleeves $a$ and $a'$, the outermost, as $a$, bearing against the head of the rail, being approximately of the same height as the rail; and the inner plate $a'$ being of less height than the rail to permit the passing of the flange of the car-wheels, both plates bearing against the foot of the rail $b$, as will be clearly seen from Fig. 21. In order that the plate $a$ may bear against the head of the rail, the top of said plate is formed with a lip or flange $a^2$, so that it bears against the side of the head of the rail. By this arrangement of the said plates $a$ and $a'$ it will be seen, that a suitable trough is the result, which not only supports the rail and prevents its displacement by the sudden jar of the passing trains, but said trough also serves to keep the rail in place should it become broken.

It is well known, that there is quite a space between the abutting ends of the rail on the draw and the rail upon the abutment or fixed portion of the bridge, and the wheels of a rapidly moving train, suddenly striking the end of the rail, tend to move said rails longitudinally in the trough just described, and beneath the holding portions of the spikes for securing the rail in position on the ties of the bridge. To prevent this longitudinal movement of the rail, I have devised the construction illustrated more especially in Figs. 7 and 8. Said device consists of suitable shoe-plates $c$ and $c'$, which embrace the opposite sides of the narrow portion or web $b'$ and the foot $b^2$ of the rail $b$, see Fig. 8, being secured in position around the rail by bolts $d$ passing through said shoe-plates $c$ and $c'$ and through the web $b'$ of the rail, and by means of bolts $d'$, for securing the lower portion $c^2$ of said plates $c$ and $c'$ together. Said shoe-plates are provided with suitable stiffening ribs $c^3$ and are of the proper width to fit snugly between two ties, their edges being made to abut against suitable metal plates $c^4$ secured against the ties, as will be seen from Fig. 7, to prevent the edges of the ties becoming battered, as will be clearly understood. Thus it will be seen, that any number of such shoes may be used, which snugly fit into the space between two ties and thereby prevent any longitudinal sliding movement of the rails.

I will now proceed to describe the construction and operation of the draw-bridge joint, illustrated more especially in Figs. 4, 5 and 6, as well as the general arrangement and operation of the mechanism for operating said joint. This mechanism is illustrated more particularly in Figs. 1, 2, 3, 9 and 10, and also in Figs. 12 and 13.

Only part of the draw and the bridge abutment is shown in the drawings, an illustration of the other parts of the bridge being unnecessary to have a clear understanding of the present invention.

In all constructions of railway bridges, as now built, there is on the center of the draw, above the truss-work, a power house containing the engine for operating the opening and closing mechanism of the draw. In order to operate the mechanism illustrated in said Figs. 1, 2 and 3, the engineer in the power house in the center of the draw, pulls upon the cable $e$, attached to a bell-crank $e'$ on the locking or latch-bar $e^2$, shown more especially in Fig. 13. This causes the said locking bar $e^2$ to move upwardly in a bearing $e^3$ on the draw, and withdraws the end $e^4$ on said bar $e^2$ from between the lock-plates $f$ and $f'$ on the pier or fixed abutment of the bridge. The said cable $e$ is connected with a lever in the engine house, adapted to be operated by hand. When said end $e^4$ of the rod $e^2$ has thus been raised to clear the highest point $f^2$ of said plates $f$ and $f'$, the engineer starts the engine in the power house on the center of the draw of the bridge. By means of an intermediate mechanism, not shown herein, said engine causes the rod $g$ arranged in bearings $g'$, see Figs. 1 and 3, to slide forward in the direction of arrow 1. See Fig. 1. Said rod $g$ is connected at its forward end $g^2$ with an arm $g^3$ secured on a shaft $g^4$ adapted to rotate in bearings between the ties. Connected with said arm $g^3$ and sliding in suitable bearings is a slide bar $h$ attached to a link-bar $h'$ provided on its free end with a hook-shaped holding or locking end $h^2$ which fits into a suitable claw $i'$ arranged on the end of a sliding lever or rod $i$ on the abutment of the bridge. Said arm $g^3$ is provided with a pivoted and weighted arm $g^5$ which forces a finger $g^6$ down into normal contact with the upper surface of said slide-bar $h$, and pivotally arranged in a bearing $h^3$ is a pivoted and weighted arm $h^4$ which forces a finger $h^5$ down in normal contact with the upper surface of said link-bar $h'$. Thus it will be seen, that the purpose of these fingers is to prevent the displacement of said bars by sudden jars when a train is rapidly passing over the draw of the bridge. While said slide-bar $h$ and its link bar $h'$ have caused said rod $i$ to move from its normal position, illustrated in Fig. 1, to the position shown in Fig. 3, a bar or rod $k$ pivoted in a bearing $k'$ secured to the rod $g$ has brought a downwardly extending push-arm $k^2$, preferably provided in the end with a roller $k^3$, against the free end of a rod $j$. Said rod is adapted to slide in a bearing $j'$ and has pivotally connected with its forward end a link $j^2$. Said link $j^2$ is secured on a shaft $l$ on which is a second link $l'$, which, as said link $j^2$ causes said shaft $l$ to partially rotate when the rod $j$ moves forward, brings the free end of said link $l'$ up against the under side of the link-bar $h'$ and lifts the end $h^2$ out of its holding engagement with the claw $i'$ on the rod $i$. As said rod $i$ is thus forced back, it causes a lever or arm $m$ to partially rotate a shaft $m'$ for the purpose of withdrawing certain sliding wedges or forks from holding contact with the abutting ends of the rail on the draw and the fixed rail on the abutment.

As will be seen from Figs. 4, 5, and 6, the device for joining the abutting ends of the draw-rail and the fixed ground rail, consists essentially of a plate $n$, one for each rail, each plate having a recess or groove $n'$ into which the abutting ends of the rails fit, and thereby prevent the turning of the draw, until the ends of the draw-rails $b$ have been raised clear of said recesses and thereby permit the turning of the draw. The recess $n'$ in each plate $n$ extends the entire length thereof, said plate also having inclined planes $n^2$, beginning at the edge of said recess and sloping away and downward, upon which the ends of the draw-rails $b$ slide as the bridge is closing, coming from either direction, and thus drop automatically into said recesses. On the other portion of said plate $n$ are formed suitable enlargements or projections $n^3$ on each side of the fixed rail on the abutment of the bridge, the inner sides of which, near the rail being tapered, and forming wedge-shaped openings. Moving between the inclined sides of said enlargements or projections $n^3$ and the web of the rail on each side thereof, and between the head and foot of the rail, is a sliding shoe or fork $n^4$, the inner surfaces of which, next to the web of the rail, are straight and parallel therewith, while the outer surfaces of said shoe are inclined, as at $n^5$, at about the same angle as the inclined surfaces of said projections $n^3$ on the plate $n$. Thus, when the rod $i$, mentioned hereinabove, is forced back, and the shaft $m'$ is partially rotated by the lever $m$, a link or arm $m^2$ pivotally connected by means of an adjustable connecting rod $m^3$ to the ears $n^6$ of said sliding shoe or fork $n^4$, will therefore cause said fork to slide or move longitudinally between said projections $n^3$ until the ends of the draw-rails $b$ are clear. Said fork or wedge $n^4$ consists of the two portions fitting snugly against the opposite sides of the web of the rail. The wedge portion on the outside of the rail is of such height, to come nearly flush with the top of the rail, thereby preventing the "pounding" or mashing down of the rail, when the car wheels of a passing train strike the ends of the rail. On the inner portion of the rail, the wedge-like portion is much lower, so as to permit the flange of the car wheel to pass the fork, as will be clearly seen from an inspection of Fig. 6 of the drawings. While the several operations of the several parts of the mechanism hereinabove mentioned have been performed, and after said sliding shoe or fork $n^4$ has been moved back, to free the ends of the draw-rails $b$, said ends of the rails are raised out of the recesses $n'$ in the plates $n$ by a cam $l^2$, one under each rail, on the shaft $l$, as will be clearly understood from Figs. 9 and 10.

The mechanism shown and described for moving the forks may be considerably varied without departing from the scope of my present invention, and is but one form that may be used. It is generally operated by steam from the power house on the bridge, or it may be worked by hand by providing the lever $m$ with a handle $m^4$, as shown in Figs. 1 and 3. The draw of the bridge is now free to turn. While said draw is open or during the closing of the same, the engineer releases the cable $e$, which permits the rod $e^2$ to assume its normal position. At the same time a cross-bar $e^5$ on said device passes down over the nose-portion $o'$ of an arm $o$ pivoted on a support $o^2$ on the rod $k$, as will be seen from Figs. 18 and 19. Said arm $o$ has a pivotal movement, being sufficient to permit the descending bar $e^5$ to pass the nose-portion $o'$ and when passed, a spring $o^3$ causes said nose-portion to engage with said bar $e^5$. When it is necessary to cause the disengagement of said nose-portion $o'$ and the bar $e^5$, siad arm $o$ is pulled back by means of a cable or wire $o^4$ secured thereto, as will be seen from Fig. 19, which permits the rod $e^2$ to be again raised, without operating the trip arm $o$, thereby allowing the draw to be again swung open without having caused the automatic locking of said post $e^2$ with the latch-bars $f$ and $f'$. Should it, however, be desired to cause the locked or holding engagement of the several devices hereinabove described, when the draw has been closed, said trip arm $o$ is allowed to remain in its holding engagement with the cross arm $e^5$, as illustrated in Fig. 3. As soon as the end $e^4$ of said bar $e^2$, see Figs. 12 and 13, rides up on either of said inclines or latch bars $f$ and $f'$, said arm and the parts connected therewith move upwardly, as indicated in dotted outline in Fig. 13, and said bar $e^5$ in going up raises the pivoted rod $k$ and disengages its downwardly extending push-arm $k^2$ from holding contact with the end of the rod or bar $j$. During this operation the rod $e^2$ has dropped down between the two latch-bars $f$ and $f'$, and the weight of the rails has caused them to drop automatically into their respective recesses $n'$ in the plates $n$, while the rod or bar $j$ and the parts connected therewith have also returned to their normal positions, due to the weight of the rails on the cams $l^2$, as will be evident. The engine in the bridge or power house is now reversed, causing the rod $g$ to move in the opposite direction, whereby the hook-shaped locking end $h^2$ on the rod or bar $h$, which is now again in its holding engagement with the claw $i'$ on the lever or rod $i$, is caused to operate the shaft $m'$, and by means of the link or arm $m^2$, the shoes or forks $n^4$ are again caused to slide forward and firmly embrace the ends of the draw-rails $b$, as shown in Fig. 5. The fork or shoe being projected from the ground or fixed rails on the immovable portion of the bridge, and engaging with the ends of the draw-rails on the opposite sides of the webs thereof, insures a very firm support for the rail and cannot become broken or displaced by the jar of passing trains. Independently secured to said shaft $m'$, as will be seen from Figs. 1, 3 and 14, is an arm $p$ with which is connected an operating rod $p'$ of a suitable semaphore $p^2$. Said semaphore is placed directly at the free end of the fixed portion of the bridge, at the side of the track, and, when the mechanism has been operated, just previous to opening the draw, said semaphore is also operated, indicating to the engineer in the bridge or power house, that the abutting ends of the draw rails and the ground or fixed rails have been disengaged from their holding contact with the wedges or forks of the draw-bridge joint, and that the draw can be safely opened.

Connected with the bell-crank $e'$, (see Figs. 1, 3 and 16) is a small arm $r$ connected with a vertical rod $r'$ adapted to slide in a bearing $r^2$ on the end of the draw. Said rod $r'$ has a lift or dog $r^3$ thereon, which, when the arm $r$ and its rod $r'$ are raised, engages with the loop-shaped holding end $s'$ of a sliding bar $s$ and disengages said end $s'$ from holding contact with a lock $t$ on the end of the draw, as will be understood from an inspection of Figs. 15 and 16. As soon as said end $s'$ has become disengaged, the weight of a signal or drop board $u$, connected with the end of said rod $s$ by a cable or chain $u'$, causes said rod $s$ to fly back and said drop-board or danger signal $u$ is displayed. At the same time a pin or other suitable device $s^2$ operates a lever $s^3$ secured on a shaft $s^4$, causing said lever or arm $s^3$ to assume the position indicated in dotted lines in said Fig. 15. When said shaft $s^4$ turns, a system of levers $s^5$ and $s^6$ operate a signal rod $s^7$, which serves as a double precaution, in case the engineer of a train neglects to see the displayed drop board $u$. In order to reverse the signals from "danger" to "safety," said rod $s$ can be pulled back by means of a chain $v$ and wheel $v'$, as shown, a pin or other suitable device $s^8$ being used to throw the lever $s^3$ back and thereby operate the shaft $s^4$ and system of levers $s^5$ and $s^6$ to turn said signal, illustrated in said Fig. 16.

Of course it will be evident, that certain changes in the arrangements and combinations of parts may be made, without departing from the scope of my invention, and therefore I do not wish to be understood as limiting myself to the exact construction, arrangements and combinations of parts herein shown and described.

The apparatus and mechanism above described are applicable to any draw-bridge joint adapted for railway bridges where it is necessary to secure a firm and safe joint.

From Figs. 1 and 3, it will be seen, that the arm $m$ connected with said rod $i$, may be extended above said rod and the arm $m$ provided with a handle or grip portion $m^4$, whereby the wedges or shoes $n^4$ can be pulled back by hand. Said rod $i$ is preferably provided with a slotted part $i^2$ into which extends a pin $m^5$ on said arm $m$, while the end of said rod $i$ is connected with the fixed portion of the bridge, by means of an adjustable compensating spring $i^3$, which spring stretches when the rod $i$ contracts in cold weather, or which spring is more or less compressed, when said rod $i$ expands in warm weather. By the use of this spring the connecting parts $i'$ on the rod $i$ and $h^2$ on the rod $h'$, as well as the wedges $n^4$, are prevented from being drawn tightly together to prevent their quick separation, when it is desired to open the draw.

Having thus described my invention, what I claim is—

1. In combination, the draw rail $b$, shoe-plates $c$ and $c'$, arranged on opposite sides of the web of the rail and embracing the rail, stiffening ribs $c^3$ on said plates, and means for securing said plates to the rail, said plates being arranged to fit between two adjacent ties, to prevent any longitudinal movement of the rail, substantially as and for the purposes set forth.

2. In combination, the draw rail $b$, shoe-plates $c$ and $c'$ arranged on opposite sides of the web of the rail and embracing the rail, means for securing said plates to the rail, and plates $c^4$ on the adjacent ties, said shoe-plates being arranged to fit between said plates $c^4$ to prevent any longitudinal movement of the rail, substantially as and for the purposes set forth.

3. In combination, the draw rail $b$, a plate $a$ arranged on one side of the rail, and having a curved lip or flange $a^2$ in close contact with the head of the rail, and a plate $a'$, arranged on the opposite side of and of less height than said rail, substantially as and for the purposes set forth.

4. The combination, with the draw of a bridge, and the fixed portion of a bridge, of latch-plates $f$ and $f'$ on said fixed portion, a movable post $e^2$ on the draw, said post normally extending down between said plates $f$ and $f'$, and mechanism connected with said post or bar $e^2$, to raise the same clear of said plates, substantially as and for the purposes set forth.

5. The combination, with the draw and the fixed portion of a bridge, of latch-plates $f$ and $f'$ on said fixed portion, a movable post $e^2$ on the draw, said post normally extending down between said plates $f$ and $f'$, and mechanism connected with said post or bar $e^2$, to raise the same clear of said plates, consisting essentially of a bell-crank $e'$ and cable connected therewith and operated from the power house on the draw, substantially as and for the purposes set forth.

6. In combination, the draw rails and the fixed or ground rails of a bridge, recessed plates $n$, having inclined planes $n^2$ tapering wedge-shaped openings in said plates $n$, a sliding wedge-shaped shoe or fork arranged and operating substantially as set forth, mechanism for operating said shoe or fork, latch-plates $f$ and $f'$ on the fixed portion of the bridge, a movable post $e^2$ on the draw, said post normally extending down between said plates $f$ and $f'$, and mechanism connected with said post or bar $e^2$, to raise said post clear of said plates, substantially as and for the purposes set forth.

7. A plate $n$, having a recess $n'$ therein, inclined planes $n^2$, and enlargements or projections $n^3$, the inner surfaces of which form wedge-shaped openings and incline inwardly in the manner of a dove-tail, substantially as and for the purposes set forth.

8. A plate $n$, having a recess $n'$ therein, inclined planes $n^2$, and enlargements or projections $n^3$, the inner surfaces of which form wedge-shaped openings and incline inwardly in the manner of a dove-tail, and a sliding fork or shoe, arranged and operating, substantially as and for the purposes set forth.

9. In combination, the draw rails and fixed ground rails of a bridge, recessed plates $n$, having inclined planes $n^2$, and enlargements or projections $n^3$, the inner surfaces of which form wedge-shaped openings and incline inwardly in the manner of a dove-tail, a sliding shoe or fork, a rod $m$, crank $m^2$, and shaft $m'$, all operating, substantially as and for the purposes set forth.

10. In combination, the draw rails and fixed ground rails of a bridge, recessed plates $n$, having inclined planes $n^2$, and enlargements or projections $n^3$, the inner surfaces of which form wedge-shaped openings and incline inwardly in the manner of a dovetail, a sliding shoe or fork, an adjustable rod $m^3$, crank $m^2$, and shaft $m'$, all operating, substantially as and for the purposes set forth.

11. In combination, the draw rails and the fixed ground rails of a bridge, recessed plates $n$, having inclined planes $n^2$, and enlargements or projections $n^3$, the inner surfaces of which form wedge-shaped openings and incline inwardly in the manner of a dove-tail, a sliding shoe or fork in each plate $n$, a rod $m^3$, crank $m^2$ and shaft $m$ for operating said shoes or forks, and cranks $l^2$ on a shaft $l$ for raising the ends of said draw-rails out of said recessed plates $n$, substantially as and for the purposes set forth.

12. In combination, the shaft $m'$ and lever $m$ connected therewith, a rod $i$ connected with said lever $m$, and mechanism detachably connected with the free end of said rod $i$ for pushing said rod $i$ forward and thereby operating said lever $m$ and shaft $m'$, substantially as and for the purposes set forth.

13. In combination, the shaft $m'$ and lever $m$ connected therewith, a rod $i$ connected with said lever $m$, and mechanism detachably connected with the free end of said rod $i$ for pushing said rod $i$ forward and thereby operating said lever $m$ and shaft $m'$, consisting essentially, of a sliding rod $g$, a pivoted arm $g^3$ connected with said rod, and a slide bar $h$ detachably connected with the free end of said rod $i$, substantially as and for the purposes set forth.

14. In combination, the draw rails and the fixed rails of a bridge, recessed plates $n$, enlargements or projections $n^3$ on said plates, forming wedge-shaped openings, a sliding fork or shoe in each plate $n$, a rod $m^3$, crank $m^2$, a shaft $m'$ and a lever $m$ connected therewith, a rod $i$ connected with said lever $m$, and mechanism detachably connected with the free end of said rod $i$ for pushing said rod $i$ forward and thereby operating said lever $m$ and shaft $m'$, substantially as and for the purposes set forth.

15. In combination, the draw rails and the fixed rails of a bridge, recessed plates $n$, enlargements or projections $n^3$ on said plates, forming wedge-shaped openings, a sliding fork or shoe in each plate $n$, a rod $m^3$, crank $m^2$, a shaft $m'$ and a lever $m$ connected therewith, a rod $i$ connected with said lever $m$, and mechanism detachably connected with the free end of said rod $i$ for pushing said rod $i$ forward and thereby operating said lever $m$ and shaft $m'$, consisting essentially of a sliding rod $g$, a pivoted arm $g^3$ connected with said rod, and a slide bar $h$ detachably connected with said rod $i$, substantially as and for the purposes set forth.

16. In combination, the draw rails $b$, a forwardly moving bar $k$, having a push arm $k^2$, a slide rod $j$, a link $j^2$, a shaft $l$ and cams on said shaft for raising the ends of said draw rails, substantially as and for the purposes set forth.

17. In combination, the draw rails and the fixed ground rails of a bridge, recessed plates $n$, enlargements or projections $n^3$ on said plates, forming wedge-shaped openings, a sliding fork or shoe in each plate $n$, a forwardly moving bar $k$, having a push arm $k^2$, a slide rod $j$, a link $j^2$, a shaft $l$ and cams $l^2$ on said shaft for raising the ends of said draw rails out of said recessed plates $n$, substantially as and for the purposes set forth.

18. The herein described means for disengaging the arm $k^2$ from engagement with the slide rod $j$, consisting essentially of a post $o$, provided with a nose-portion $o'$, and a bar $k$ on which said post is secured, substantially as and for the purposes set forth.

19. The herein described means for disengaging the arm $k^2$ from engagement with the slide rod $j$, consisting essentially of a post $o$, provided with a nose-portion $o'$, and a bar $k$ on which said post is secured, in combination, with a vertically moving bar or rod $e^2$, having a cross-bar $e^5$, adapted to engage with said nose-portion $o'$ on said post $o$, substantially as and for the purposes set forth.

20. In combination, the rod $e^2$, bell-crank $e'$, lever $r$, rod $r'$, and mechanism operated by said rod, when the draw is opened, for automatically releasing a drop board or signal, substantially as and for the purposes set forth.

21. In combination, the rod $e^2$, bell-crank $e'$, lever $r$, rod $r'$, and mechanism operated by said rod, when the draw is opened, for automatically releasing a drop board or signal, comprising therein, a rod $s$, connected with a stop $t$, a dog $r^3$ on said rod $r'$ adapted to release said rod $s$ from said stop $t$, and a signal board connected with said rod $s$, substantially as and for the purposes set forth.

22. In combination, the rod $e^2$, bell-crank $e'$, lever $r$, rod $r'$, and mechanism operated by said rod, when the draw is opened, for automatically releasing a drop board or signal, comprising therein, a rod $s$, connected with a stop $t$, a dog $r^3$ on said rod $r'$ adapted to release said rod $s$ from said stop $t$, a signal board connected with said rod $s$, pins $s^3$ on said rod $s$, a lever $s^3$, a shaft $s^4$, and a system of levers $s^5$ and $s^6$, and a signal and signal rod $s^7$ operated thereby, all arranged, substantially as and for the purposes set forth.

23. In combination, the draw rails and fixed ground rails of a bridge, recessed plates $n$ having inclined planes $n^2$ and enlargements or projections $n^3$, the inner surfaces of which form wedge-shaped openings and incline inwardly in the manner of a dove-tail, a sliding shoe or fork, a rod $m$, crank $m^2$ and shaft $m'$, an arm $p$ on said shaft, a rod $p'$, and a semaphore mechanism connected with and operated by said rod $p'$, substantially as and for the purposes set forth.

In testimony that I claim the invention set forth above I have hereunto set my hand this 7th day of April, 1894.

WILLIAM R. MERSHON.

Witnesses:
FREDK. C. FRAENTZEL,
SAMUEL SMITH.